No. 746,707. PATENTED DEC. 15, 1903.
J. JECKLIN.
CHUCK.
APPLICATION FILED JULY 5, 1902.
NO MODEL.
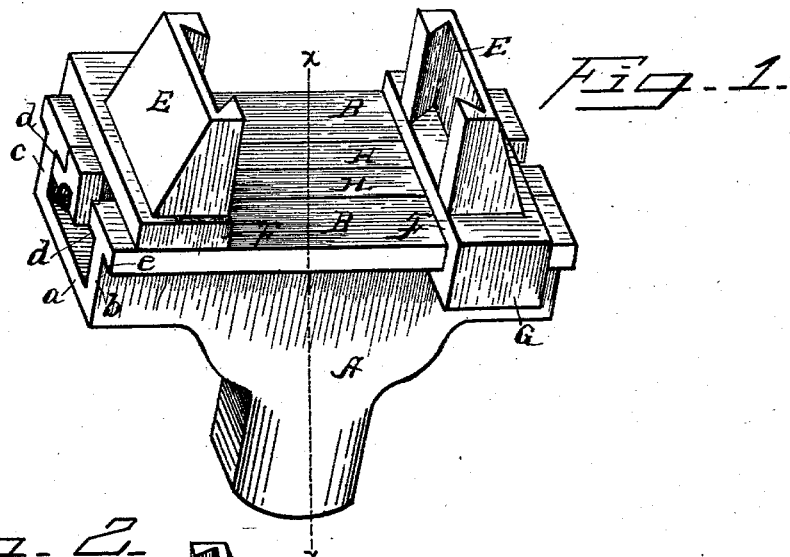
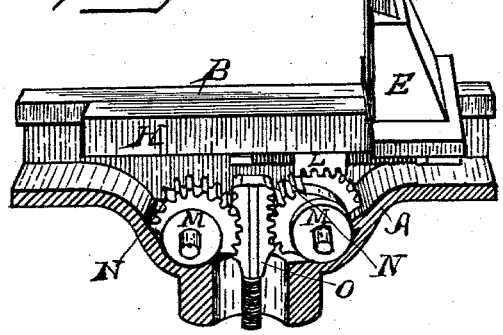
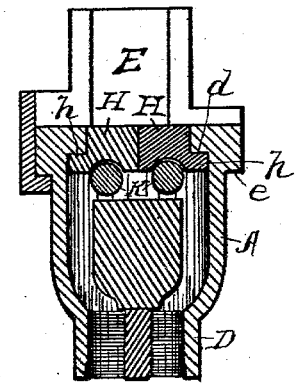
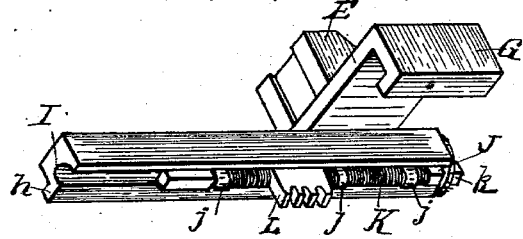
WITNESSES:
E E Cady
M. M. O'Dea
INVENTOR.
Jacob Jecklin
BY
M. M. Cady
ATTORNEY.

No. 746,707. Patented December 15, 1903.

UNITED STATES PATENT OFFICE.

JACOB JECKLIN, OF DUBUQUE, IOWA, ASSIGNOR OF ONE-HALF TO CHARLES W. SCHREIBER, OF DUBUQUE, IOWA.

CHUCK.

SPECIFICATION forming part of Letters Patent No. 746,707, dated December 15, 1903.

Application filed July 5, 1902. Serial No. 114,437. (No model.)

*To all whom it may concern:*

Be it known that I, JACOB JECKLIN, a citizen of the United States, residing in the city and county of Dubuque and State of Iowa, have invented certain new and useful Improvements in Chucks; and I do hereby declare the following to be a full, clear, and exact description of the invention, which will enable others skilled in the art to which it appertains to make and use the same.

My invention relates to stock-holding or work chucks, with special reference to those having two jaws used with turret-lathes and adapted to rotate at a high rate of speed with the work while it is being operated upon.

One of the objects of my invention is to so construct the chuck that the faces of the jaws will always be maintained in parallel planes under whatever torsional or wrenching strain they may be subjected to and the face of the chuck completely closed to prevent any inteference by the chips with the operating-gear.

Another object is to provide a convenient and effective means for quickly and uniformly grasping and releasing the work, whereby there will be a minimum loss in time in changing the work and the work will be uniformly presented to the cutter.

A further object is to so construct the chuck that its weight shall be as near as possible to the center of rotation, whereby the chuck, with the work therein, can be rapidly rotated in one direction and then either suddenly stopped or reversed with the least possible strain on the lathe or power which operates it.

The following specification will state in detail how the various objects are accomplished, when taken in connection with the drawings accompanying the same and forming a part hereof.

Figure 1 is a perspective view of the chuck. Fig. 2 is a side elevation with one side of the outer casing and one jaw of the chuck removed. Fig. 3 is a perspective view of one of the jaws removed. Fig. 4 shows a section through line X X of Fig. 1.

Like letters of reference denote corresponding parts in each of the drawings.

Referring now to the drawings, A designates the casing or body of the chuck, which may be constructed in two parts and bolted together or cast in a single piece, having the sides $a\ b\ c$, with the sides $b$ and $c$, terminating at their upper edges in plates B. These plates B are somewhat wider than the thickness of the sides $b$ and $c$ and form projecting ledges or guides $d$ on both sides of $b$ and $c$ at their upper edges for the purposes presently to appear.

The lower part of the casing A terminates in a hollow shank D, which is screw-threaded on its inner end, by which it is adapted to be attached to the spindle of a turning-lathe.

The jaws of the chuck are constructed in one piece and consist of the grasp E, set upon a base terminating in a hook G along one end of the base F and adapted to grasp the outer ledge or guide $e$ of the plates B. To the under side of the base F of the jaw is an arm H, extending forward beneath the opposite grasping portion or face E. Along the lower longitudinal edge of this arm H is a ledge or guide $h$, which is adapted to project beneath the guide $d$ of the plate B.

Longitudinally along in the under side of the arm H is a groove or recess I, and upon the rear end of each arm is a cap J. Through the cap J and along in the recess I passes a bolt K, screw-threaded nearly its entire length and provided with a head $k$ on its end outside of the cap J, to which bolts are attached the nut-rack L. These bolts K are held in the recess I by straps $j$, attached to the arms H. It will be observed that by this mode of construction the arm H of each jaw projects forward past the center beneath the opposite jaw and the two arms fill the space between the two plates B and the two faces E, thus preventing any chips of the work passing into or clogging or in any manner interfering with the gear, presently to be described, for operating the jaws. It will also be observed that since the arms project inward past each other and over the center beneath the opposite jaw the main weight of the jaws will be thrown near the center instead of outward from the center, as would be the case if the base of the jaws projected in the rear of the grasps. It will be still further observed, since each arm projects beneath the opposite jaw, that any strain or wrench of one jaw will be transmitted to the opposite jaw, and hence the face of both jaws will always remain in parallel planes under whatever strain they may be subjected to. This is a great advantage, as by this mode of construction the work will always be presented uniformly to the cutters.

Within the casing beneath each arm H is pivoted a pinion M, provided with teeth N, which teeth are adapted to mesh in with the teeth on the nut-rack L.

For the purpose of partially rotating the pinions M there is set a double-toothed rack O, which engages with the teeth N on the pinions M. The opposite or outer end of the rack is screw-threaded, and thus adapted to be secured to the pull-bar P. The outer end of the pull-bar P is screw-threaded, and there is secured thereon a screw-handle Q. The pull-bar passes through the spindle C. To this spindle is attached the chuck. The spindle is rotated in the bearings S by power applied to the cone-pulley T. It will be seen by this mode of construction and setting the jaws with their arms fitted to slide in reverse ways past each other and adapted to be moved past the center and beneath the face of the opposite jaw that the pinions for operating the jaw may be very small and set close together near the center and the weight of the jaws, the weight of the pinions, and the weight of the operating-gear will all be near the center of rotation and when the chuck is rapidly rotated there will be the minimum of centrifugal force to overcome and the minimum of strain on the belt and power when the chuck is suddenly stopped or reversed in its rotation.

The manner of operating my device is substantially as follows: The operator, with a wrench applied to the head $k$ of the bolt K, adjusts the jaws to the size of the work then to be operated upon, then places the work between the jaws, then grasps the handle Q and rotates it in one direction, whereby the pull-bar P is drawn outwardly, and as it is attached to the double-toothed rack O it draws the toothed rack outwardly and rotates the pinions N by engagement of its teeth with the teeth of the pinion. This movement draws the grasping portions of the jaws toward each other and causes them to grip the work rigidly by the teeth N, engaging with the nut-rack L, and at the same time the arms H are forced in the same parallel plane to each other and across the center of rotation and beneath the opposite jaw, and as the arms are a part of the jaws any strain upon one jaw will be transmitted to the grasping portion of the other, and the work will be gripped equally by both jaws in the same place on the jaw, and the faces or grasping portion of the jaws will be maintained in the same parallel planes, whereby there will be a uniform presentation of the work to the cutters. To remove the work, the operator reverses the handle Q, which draws the double-toothed rack O outwardly and rotates the pinions N, which releases the grasp of the jaws upon the work by the engagement of the teeth of the pinion N with the nut-rack L.

The details of construction may be varied within a wide range without departing from the spirit of my invention.

What I claim, and desire to secure by Letters Patent, is—

1. In a chuck, a casing provided at one side with means for connection with a lathe-spindle and having a longitudinal recess in its opposite face, a pair of jaws upon the recessed face of the casing and adjustable toward and away from one another, arms carried by the jaws and lying in the recess, each arm being in frictional engagement throughout its entire length with the other arm upon its inner face and also projected beneath the opposite jaw, said arms closing the outer open side of the recess.

2. In a chuck, a casing provided at one side with means for connection with a lathe-spindle and having a longitudinal recess in its opposite face, guides at opposite sides of the recess, jaws mounted to slide on the guides, and arms carried by the jaws and working in the recess, each arm being in frictional engagement throughout its entire length with the other arm upon its inner face and also projected beneath the opposite jaw, said arms closing the outer open side of the recess.

3. In a chuck, a casing provided at one side with means for connection with a lathe-spindle and having a longitudinal recess in its opposite side, jaws adjustable toward and away from one another upon the recessed side of the casing, arms carried by the jaws and working in the recess, each arm being in frictional engagement throughout its entire length with the other arm upon its inner face and also projected beneath the opposite jaw, said arms closing the outer open side of the recess, and means located within the recess and beneath the arms for adjusting the jaws.

4. In a chuck, a casing provided at one side with means for connection with a lathe-spindle and having a longitudinal recess in its opposite face, jaws adjustable toward and away from one another upon the recessed side of the casing, arms carried by the jaws and working in the recess, each arm being in frictional engagement throughout its inner face with the inner face of the other arm and also projected beneath the opposite jaw, said arms closing the outer open side of the recess, racks upon the under sides of the arms, and adjusting-pinions mounted within the recess and in engagement with the respective racks.

5. In a chuck, a casing, jaws each provided with an arm to move within the casing in opposite directions and projected beneath the opposite jaw, and means for operating the jaws consisting of pinions engaging the arms and a double-toothed rack engaging the pinions.

6. In a chuck, a casing, guides in the casing, jaws each provided with an arm engaging and traveling in one of the guides and beneath the other jaw, and means for moving the jaws with their arms in reverse directions, said means consisting of pinions engaging each jaw and a double-toothed rack engaging the pinions.

7. In a chuck, a casing, guides in the casing, jaws each provided with a grasping-face engaging the guides and also provided with an arm projected beneath the opposite jaw and working in one of the guides, and means for adjusting the jaws consisting of pinions to engage the jaws and a double-toothed rack to engage the pinions.

8. In a chuck, a casing, guides in the casing, jaws each consisting of a grasping-face and an arm movable in the casing and projected beneath the opposite jaw, a screw attached to each jaw for adjusting the position of the jaw relative to the work, a rack attached to each screw, pinions engaging the respective racks, and a double-toothed rack engaging the pinions to simultaneously adjust the jaws.

9. In a chuck, a casing provided with a longitudinal recess, external guides upon the casing and at opposite sides of the recess, internal guides within the recess and at opposite sides thereof, jaws having grasping portions slidably engaging the external guides, arms carried by the jaws and working in the recess in engagement with the internal guides, each arm being projected beneath the opposite jaw and in frictional engagement throughout its inner face with the other arm, said arms closing the outer open side of the recess, and means for adjusting the jaws.

10. In a chuck, a casing provided with outside and inside guides, jaws slidably mounted on the outside guides, each jaw having an arm projected beneath the opposite jaw and working upon the inside guides, a screw carried by each jaw for adjusting the position thereof, a rack on each screw, and means engaging the racks for operating the same to adjust the jaws with their arms simultaneously in reverse directions.

11. In a chuck, a casing provided with outside and inside guides, jaws mounted to slide upon the outside guides, arms carried by the jaws and working upon the inside guides, each arm being projected beneath the opposite jaw, a screw on each jaw, a rack upon each screw, a pinion engaging each rack, and a double-toothed rack engaging the pinions for simultaneously adjusting the jaws in reverse directions.

12. In a chuck, a casing provided with a longitudinal recess, outside guides at opposite sides of the recess, inside guides within the recess and at opposite sides thereof, jaws mounted to slide upon the outside guides, arms carried by the jaws and working within the recess in engagement with the inside guides, each arm being in frictional engagement throughout its inner side with the other arm and projected beneath the opposite jaw, said arms closing the outer open side of the recess, and means for adjusting the jaws consisting of pinions engaging the arms and a double-toothed rack engaging the pinions.

In testimony whereof I have signed my name to this specification in the presence of two subscribing witnesses.

JACOB JECKLIN.

Witnesses:
M. M. CADY,
E. B. LAKE.